July 17, 1973    P. D. PORTA ET AL    3,746,658
CATALYSTS

Filed May 1, 1970    2 Sheets-Sheet 1

INVENTORS
PAOLO dELLA PORTA
TIZIANO A. GIORGI
BRUNO KINDL
MARIO ZUCCHINELLI 3,746,658
CATALYSTS
Paolo Della Porta, Tiziano A. Giorgi, Bruno Kindl, and Mario Zucchinelli, Milan, Italy, assignors to S.A.E.S. Getters S.p.A., Milan, Italy
Continuation-in-part of application Ser. No. 527,906, Feb. 16, 1966. This application May 1, 1970, Ser. No. 33,695
Int. Cl. B01j *11/74*
U.S. Cl. 252—439                                        5 Claims

ABSTRACT OF THE DISCLOSURE

A catalytic structure and process for catalyzing chemical reactions. The catalytic structure comprises:
(a) a metallic substrate; and
(b) a finely divided catalytic material partially embedded in the substrate and projecting therefrom.

Cross reference to related applications

This application is a continuation-in-part of parent application Ser. No. 527,906 filed Feb. 16, 1966, now abandoned, the disclosure of which is incorporated herein by reference.

The catalysts of the present invention can be produced by a process disclosed in the above identified parent application and in application Ser. No. 33,794 now U.S. Pat. No. 3,652,317 entitled "Method of Producing Substrate Having a Particulate Metallic Coating" filed concurrently herewith.

Disclosure

Catalysts are widely employed in streams of reactants to increase, decrease, or moderate chemical reactions, especially those in the gaseous phase. It is well known to employ catalytic materials having the highest possible surface area to mass ratio. This is generally accomplished by employing the catalytic material in a finely divided form. However, such finely divided catalytic material must in some manner be held in the reactant stream. A number of specific catalytic structures have been suggested such as those having the finely divided catalytic material completely embedded in a substrate as shown for example in Holt et al. U.S. 3,296,025 (1967). An alternative structure employs the finely divided catalytic material with a binder which is pressed into the interstices of a screen as described for example in Holt et al. U.S. 3,288,653 (1966).

Unfortunately, the above and other prior art structures suffer from a number of disadvantages. Generally it has been impossible or impractical to achieve the desired high surface area to mass ratio either because the act of pressing the catalytic material onto the substrate or screen substantially reduces the total surface area or because of the use of a binder partially covers a portion of the surface of the catalytic material. The use of a binder sometimes causes undesirable and/or unpredictable side reactions during the chemical reaction. An especially acute problem of prior catalytic structures is evidenced during their use in exothermic reactions. In such reactions an amount of heat is released by the reactants immediately adjacent to the surface of the particles. The particles generally have a poor thermal conductivity between themselves and between the substrate with the result that the particles become heated which retards the rate of the exothermic reaction. On the other hand certain reactions are endothermic with the result that the heat of reaction is absorbed from the particles cooling them. This cooling of the particles causes a reduction in the rate of reaction.

Accordingly it is an object of the present invention to provide an improved catalytic structure and a process for employing the same which are substantially free of one or more of the disadvantages of the prior art.

Another object is to provide an improved catalytic structure which has a high surface area to mass ratio. A further object is to provide an improved catalytic structure which does not require the use of a binder or other liquid.

A still further object is to provide an improved catalytic structure wherein the particles of catalytic material have a good thermal conductivity rendering it possible to remove the heat of reaction from the surface of the particles.

Yet another object of the present invention is to provide an improved catalytic structure which has the ability to add heat to an endothermic reaction.

Still another object is to provide an improved process for catalyzing chemical reactions.

Additional objects and advantages of the present invention will be apparent to those skilled in the art by reference to the following detailed description thereof and drawings wherein.

Figure 3:
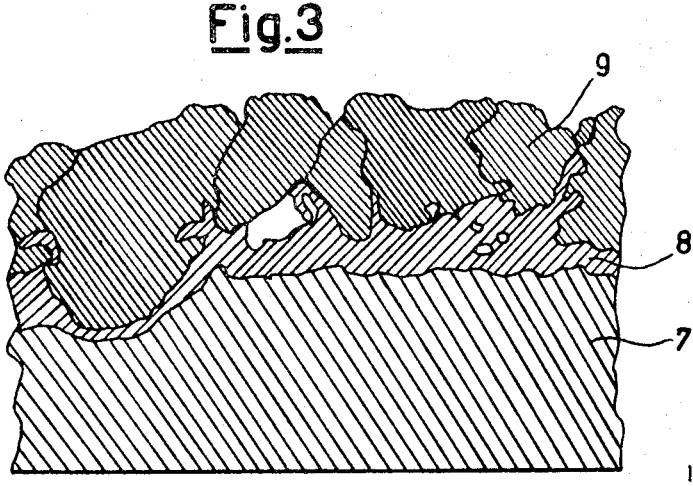
Figure 4:
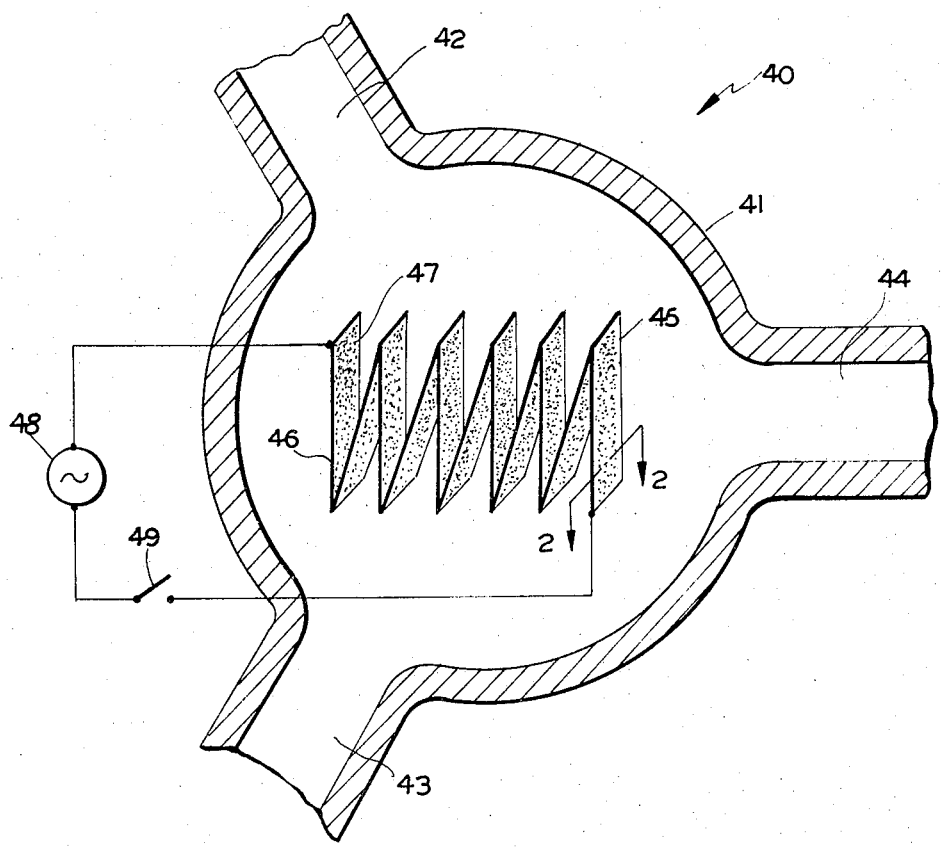

FIG. 3 in a cross-sectional view with an enlargement of about 1300 diameters of a modified embodiment of the catalytic structure of the present invention; and FIG. 4 is a schematic representation of a reactor employing the catalytic structure of the present invention in the process of the present invention.

According to the present invention there is provided a structure for catalyzing chemical reactions, said structure comprising:

(a) a metallic substrate;
(b) a finely divided catalytic material partially embedded in the substrate and projecting therefrom.

A wide variety of metallic substrates can be employed in the broadest aspects of the present invention, however, in order to provide for heat transfer from the catalytic material to the substrate or from the substrate to the catalytic material the metallic substrate is preferably one of high thermal conductivity. Additionally when it is desired to employ the catalytic structure to catalyze an endothermic reaction the metallic substrate is a material of high ohmic resistance and generally one of a material having a resistivity of 1 to 200 microhm-cm. at 30° C. By the use of such a substrate a potential can be impressed across the ends of the substrate causing an electrical current to flow heating the substrate due to its resistivity and transferring this heat to the catalytic material and hence to the reactants. Examples of materials suitable for use as substrates in the present invention include among others: aluminum, iron, stainless steel and Nichrome.

The finely divided catalytic material employed in the present invention is that which will catalyze the desired chemical reaction. In one preferred embodiment these catalytic materials are nonmetals examples of which include among others oxides such as alumina, zirconia, ferric oxide, ferrous oxide, iron oxide, nickel oxide, zinc oxide; and salts such as potassium chromate, aluminum chloride, tungsten sulfide, silver fluoride and cupric chloride. In another preferred embodiment the catalytic materials are those of a metallic catalyst and preferably one which is susceptible to cold welding to the metallic substrate and autogeneously to the other catalytic particles. Examples of suitable metal catalysts include among others Ag, Zr, Pt, Au, Ir, Ni, Co, Fe, Pd, Os, Mn, Mo, Rh, mixtures thereof, alloys thereof or alloys with other metals which do not materially reduce their catalytic characteristics. For example small amounts of promoters can be incorporated in these metal catalysts.

The finely divided catalytic material is generally that which passes through a U.S. standard screen of 10 mesh per inch and preferably that which passes through a U.S. standard screen of 100 mesh per inch and is retained on a U.S. standard screen of 600 mesh per inch. When the catalytic material comprises a layer only about one particle diameter thick on the substrate then the catalytic material is only partially embedded in the substrate and has at least half of its surface area exposed for catalytic reaction. When the layer of particles of catalytic material on the substrate has a thickness of two to five times the average particle diameter then the particles in contact with the substrate are attached thereto by being partially embedded therein, whereas the other particles are attached to one another by cold microwelds.

The catalytic structures of the present invention are produced by a process described in the parent application and in Ser. No. 33,794 filed concurrently herewith, now U.S. Pat. No. 3,652,317. An important feature of the catalytic structure of the present invention inherent in structures produced by the disclosed process is the high surface area to mass ratio and the non-planar upper surface of the layer of catalytic material. Both of these characteristics are believed to be due to the use of an intermediate body as described in these applications. Although there is no desire to limit the catalytic structures of the present invention to only those produced by the process of the above described applications other processes have been found to be unsuitable for producing this structure. In the process of the above described applications the particles of catalytic material are embedded in the substrate by pressing an intermediate body against the particles lying on the substrate with a force sufficient to surpass the plastic deformation point of the substrate whereby the catalytic particles are only partially embedded in the substrate having at least half of their surface area exposed to the gas for catalytic reaction. The hardness relationship of the particles, the substrate and the intermediate body is critical to the present invention. The particles must be harder than the substrate. The intermediate body must be softer than the particles but harder than the substrate. The intermediate body is preferably of a work hardenable metal. For example, if the intermediate body is of the same hardness as the substrate, the particles will be randomly embedded in the substrate and the intermediate body. On the other hand if the substrate is harder than the intermediate body the particles will preferentially embed themselves into the intermediate body. If the particles are softer than either the intermediate body or the substrate they will be plastically deformed losing their surface area and will not become embedded in the substrate.

According to another aspect of the present invention there is provided an improved process for catalyzing reactions by contacting the reactants with the catalytic structure of the present invention. When the reaction is an endothermic one an electrical current is caused to flow through the substrate which in this case is of high ohmic resistance, heating it and transferring heat to the catalytic particles and hence to the gaseous reactants in order to increase the rate of the endothermic reaction. On the other hand when the reaction to be catalyzed is an exothermic one the high thermal conductivity of the metallic substrate causes the heat evolved during the exothermic reaction to be conducted away from the surface of the catalytic particles by the substrate which acts as a heat sink. Since the substrate of the present invention can be a continuous vapor-impermeable, surface the substrate can form the wall of a container holding a heat transfer medium such as cold water, brine, or liquid nitrogen depending upon the desired temperature of the catalytic material.

While the catalytic structure of the present invention can be employed to catalyze any reaction in any phase they are most preferably employed when the reactants are in the gaseous phase.

Figure 1:
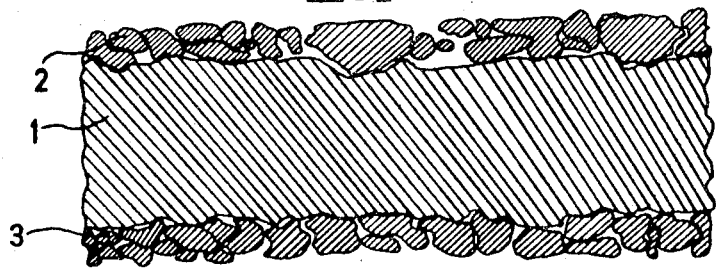
FIG. 1 is a cross-sectional view with an enlargement of about 300 diameters, of a catalytic structure of the present invention having a layer of catalytic material approximately one particle diameter thick.

Referring now to the drawings, and in particular to FIG. 1, there is shown a catalytic structure of the present invention. This catalytic structure comprises:

(a) a stainless steel substrate 1, and
(b) a finely divided catalytic material 2 partially embedded in the upper surface of the substrate 1 and projecting therefrom, and a finely divided catalytic material 3 partially embedded in the lower surface of the substrate 1 and projecting therefrom. In this case the catalytic material is zirconium alloy.

Figure 2:
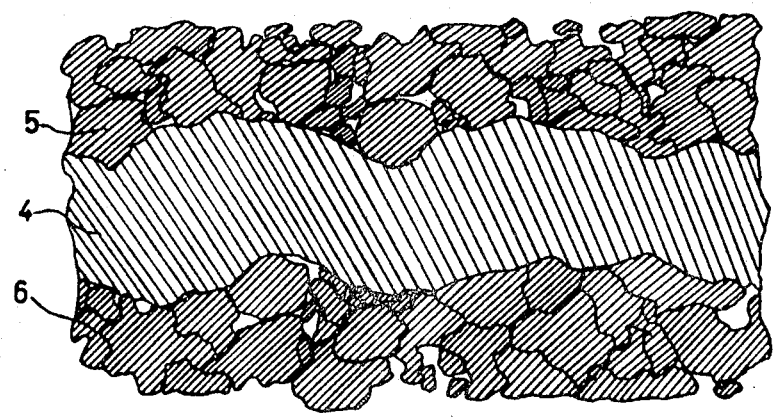
FIG. 2 is a cross-sectional view with an enlargement of about 300 diameters of the catalytic structure of the present invention wherein the layer of catalytic material is approximately three particle diameters thick; this figure is an enlarged view taken along the line 2—2 of FIG. 4.

In FIG. 2 the substrate 4 has two layers of catalytic particles 5 and 6. The layers of particles 5 and 6 are approximately four to five particle diameters thick. The particles 2, 3, 5 and 6 of zirconium alloy are harder than the stainless steel substrate 1 and 4.

In the modified form of the invention shown in FIG. 3 the substrate 8 is an aluminum coating on a base 7. The catalytic particles 9 are embedded in the substrate 8.

Referring now to FIG. 4, there is shown a reaction 40 suitable for using the catalytic structure of the present invention. The reactor 40 comprises a body 41 having the first inlet 42, a second inlet 43 and an outlet 44. Within the body 41 of the reactor 40 is a catalytic structure 45 comprising a substrate 46 of high ohmic resistance having a finely divided catalytic material 47 partially embedded in the substrate 46 and projecting therefrom. The catalytic structure 45 is in series circuit with a power source 48 and a switch 49.

In order to catalyze an endothermic reaction the switch 49 is closed causing the substrate 46 to heat thereby the catalytic material 47. A first reactant gas is caused to enter the body 41 through the first inlet 42 and a second reactant gas is caused to enter the body 41 through the inlet 43. The gaseous reactants contact the catalytic material 47 whereby they are caused to endothermically react and leave the reactor 40 through the outlet 44.

In case of an exothermic reaction the switch 49 is left open whereby the heat produced by the reaction at the surface of the catalytic material 47 is conducted to the substrate 46 wherein it is partially dissipated by the flow of the reactant gases through the reactor 40.

In a catalyst of the present invention wherein the layer of catalytic material has a thickness of about five times the average diameter of the catalytic particles (for example a layer about 250 microns thick), up to 90% of the total surface area of the particles is exposed to the reactants. In the case of a catalytic structure having a layer whose thickness equal to the average diameter of the catalytic particles the area of the surface exposed to the gases is about the 60% of the total surface area of the particles. In any case, according to the invention, specific active areas of about 2 (or more) square centimeters per milligram of catalytic material can be obtained.

Catalytic structures of the present invention exhibit outstanding mechanical and thermal characteristics both before and after the high-temperature heating. It has been seen, in practice, that catalytic structures easily withstand mechanical shocks induced, for example, by ultrasonic treatments and thermal stresses by rapid heating up to 1000° C. or more depending upon the melting point of the substrate.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the process of the present invention.

A catalytic structure comprising an iron substrate and having thereon a coating of finely divided osmium is placed into a reactor similar to that shown in FIG. 4. Nitrogen is caused to enter the inlet 42 and hydrogen is caused to enter in inlet 43. Ammonia leaves the outlet 44. The reaction proceeds according to the equation:

$$N_2 + 3H_2 \rightleftharpoons 2NH_3$$

The gas leaving the outlet 44 can also contain some unreacted nitrogen and unreacted hydrogen which may be separated and recycled according to procedures having no relation to the present invention.

EXAMPLE 2

Example 1 is repeated except that the substrate has a resistivity of 150 microhm-cm. and switch 49 is closed. Endothermically reactable gases are caused to enter the inlets 42 and 43.

Although the invention has been described in considerable detail with reference to certain preferred embodiments thereof, it will be understood that variations and modifications can be effected within the spirit and scope of the invention as described above and as defined in the appended claims.

What is claimed is:

1. A catalytic structure which when contacted with gaseous reactants will catalyze the reaction between the reactants, said structure comprising:
   (a) a metallic substrate of high thermal conductivity selected from the group consisting of aluminum, iron, stainless steel and Nichrome,
   (b) a metallic catalytic material partially embedded in the substrate in thermal conductivity therewith and projecting from the substrate
      wherein the thickness of the layer of catalytic material is equal to 2 to 5 times the average particle diameter, and wherein the particles are held to one another by cold microwelds which do not materially reduce the total surface area of the particles
      wherein the catalytic material is selected from the group consisting of alumina, zirconia, ferric oxide, ferrous oxide, iron oxide, nickel oxide, zinc oxide, potassium chromate, aluminum chloride, tungsten sulfide, silver fluoride, cupric chloride, Ag, Zr, Pt, Au, Ir, Ni, Co, Fe, Pd, Os, Mn, Mo, Rh, mixtures thereof and alloys thereof.

2. A catalytic structure for catalyzing chemical reactions, said structure comprising:
   (a) a metallic substrate selected from the group consisting of aluminum, iron, stainless steel and Nichrome,
   (b) a finely divided metallic catalytic material partially embedded in the substrate and projecting therefrom wherein the catytic material has an exposed surface area of at least 2 cm.$^2$/mg.
      wherein the catalytic material is selected from the group consisting of alumina, zirconia, ferric oxide, ferrous oxide, iron oxide, nickel oxide, zinc oxide, potassium chromate, aluminum chloride, tungsten sulfide, silver fluoride, cupric chloride, Ag, Zr, Pt, Au, Ir, Ni, Co, Fe, Pd, Os, Mn, Mo, Rh, mixtures thereof and alloys thereof.

3. A catalytic structure which when contacted with gaseous reactants will catalyze the reaction between the reactants, said structure comprising:
   (a) a metallic substrate of high thermal conductivity selected from the group consisting of aluminum, iron, stainless steel and Nichrome,
   (b) a finely divided metallic catalytic material partially embedded in the substrate in thermal conductivity therewith, wherein the catalytic material is of a particle size that passes through the U.S. standard screen of 100 mesh/inch and is retained on a screen of 600 mesh/inch;
      wherein the catalytic material comprises a layer having a thickness equal to 2 to 5 times the average particle diameter; wherein the particles are held to one another by cold microwelds which do not materially reduce the total surface area of the particles; wherein the particles have an exposed surface area of at least 2 cm.$^2$/mg.
      wherein the catalytic material is selected from the group consisting of alumina, zirconia, ferric oxide, ferrous oxide, iron oxide, nickel oxide, zinc oxide, potassium chromate, aluminum chloride, tungsten sulfide, silver fluoride, cupric chloride, Ag, Zr, Pt, Au, Ir, Ni, Co, Fe, Pd, Os, Mn, Mo, Rh, mixtures thereof and alloys thereof.

4. A catalytic structure which when contacted with gaseous reactants will catalyze the reaction between the reactants, said structure comprising:
   (a) a metallic substrate of high ohmic resistance selected from the group consisting of aluminum, iron, stainless steel and Nichrome,
   (b) a finely divided metallic catalytic material partially embedded in the substrate in thermal conductivity therewith; wherein the catalytic material is of a particle size that passes through the U.S. standard screen of 100 mesh/inch and is retained on a screen of 600 mesh/inch; wherein the catalytic material comprises a layer having a thickness equal to 2 to 5 times the average particle diameter; wherein the particles are held to one another by cold microwelds which do not materially reduce the total surface area of the particles; wherein the particles have an exposed surface area of at least 2 cm.$^2$/mg.
      wherein the catalytic material is selected from the group consisting of alumina, zirconia, ferric oxide, ferrous oxide, iron oxide, nickel oxide, zinc oxide, potassium chromate, aluminum chloride, tungsten sulfide, silver fluoride, cupric chloride, Ag, Zr, Pt, Au, Ir, Ni, Co, Fe, Pd, Os, Mn, Mo, Rh, mixtures thereof and alloys thereof.

5. A catalytic structure for catalyzing chemical reactions, said structure comprising:
   (a) a metallic substrate selected from the group consisting of aluminum, iron, stainless steel and Nichrome,
   (b) a finely divided metallic catalytic material partially embedded in the substrate and projecting therefrom wherein the particles are embedded in the substrate by pressing the particle against the substrate with a force sufficient to surpass the plastic deformation point of the substrate whereby the catalytic particles are only partially embedded in the substrate, having at least half of their surface area exposed
      wherein the catalytic material is selected from the group consisting of alumina, zirconia, ferric oxide, ferrous oxide, iron oxide, nickel oxide, zinc oxide, potassium chromate, aluminum chloride, tungsten sulfide, silver fluoride, cupric chloride, Ag, Zr, Pt, Au, Ir, Ni, Co, Fe, Pd, Os, Mn, Mo, Rh, mixtures thereof and alloys thereof.

References Cited

UNITED STATES PATENTS

| | | | |
|---|---|---|---|
| 2,128,457 | 8/1938 | Fairchild | 252—477 R |
| 2,356,954 | 8/1944 | Teter | 252—477 R |
| 3,134,696 | 5/1964 | Douglas et al. | 136—86 F |
| 3,228,892 | 1/1966 | Cole et al. | 252—477 R |
| 3,231,520 | 1/1966 | Leak et al. | 252—477 R |
| 3,513,109 | 5/1970 | Stiles | 252—477 R |
| 3,554,929 | 1/1971 | Aarons | 252—477 R |
| 3,565,830 | 2/1971 | Keith et al. | 252—477 R |
| 2,963,782 | 12/1960 | Donnelly | 29—183.5 |

OTHER REFERENCES

Alexander et al., A Catalyst Mounting Technique For Close Temperature Control, The Canadian Journal of Chemical Engineering, December 1965, pp. 346–348.

DANIEL E. WYMAN, Primary Examiner

W. J. SHINE, Assistant Examiner

U.S. Cl. X.R.

252—477 R